Dec. 2, 1930.  F. C. BARTON  1,783,899
RADIO RECEIVING APPARATUS
Filed July 22, 1925

Inventor:
Fred C. Barton,
by
His Attorney.

Patented Dec. 2, 1930

1,783,899

UNITED STATES PATENT OFFICE

FRED C. BARTON, OF SCHENECTADY, NEW YORK, ASSIGNOR TO GENERAL ELECTRIC COMPANY, A CORPORATION OF NEW YORK

RADIO RECEIVING APPARATUS

Application filed July 22, 1925. Serial No. 45,392.

My present invention relates to receiving apparatus and more particularly to receiving sets of the portable type.

In a portable receiving set employing dry batteries for its operation a large part of the weight of the set lies in the batteries. It is therefore desirable to reduce the size and number of the batteries employed as much as possible and yet provide sufficient battery capacity to operate the set for a reasonable period of time. When, however, the set is to be used for a considerable period of time at a fixed point it is more economical to provide larger batteries outside of the set and interchanging means for readily disconnecting the internal batteries and connecting the external batteries to the set. This will relieve the drain on the batteries within the set and enable them to be made smaller and fewer in number.

One of the objects of my invention is to provide a means whereby a larger set of batteries than those contained within the receiving set can be readily connected to the receiving set. A further object of my invention is to arrange the connecting means in such a way that when the external batteries are connected to the receiving apparatus the batteries within the set will be automatically disconnected therefrom.

Figure 1:
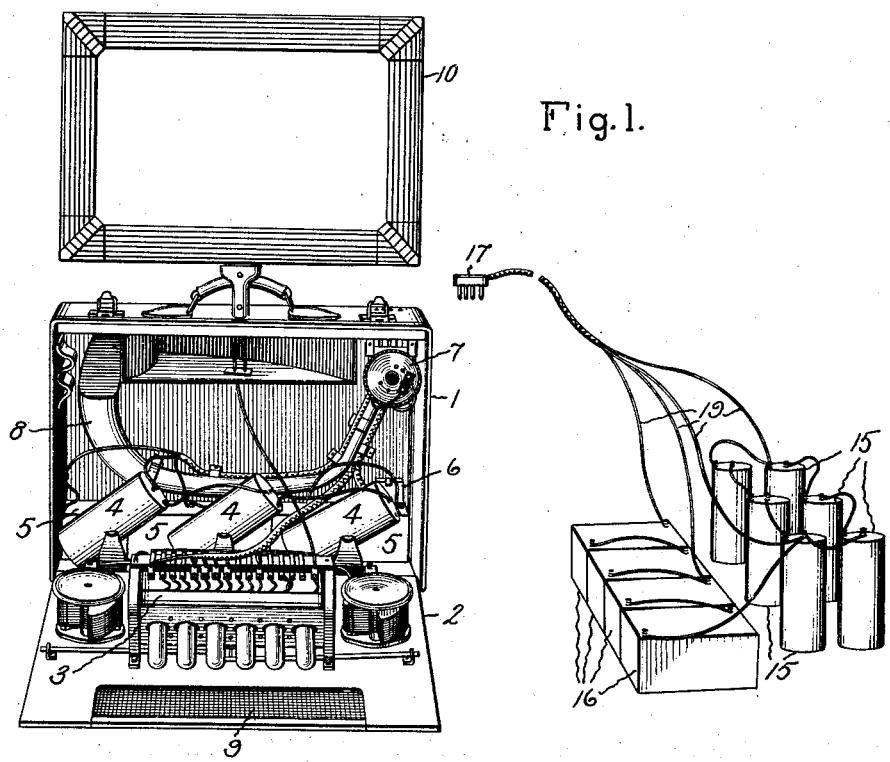
Figure 2:
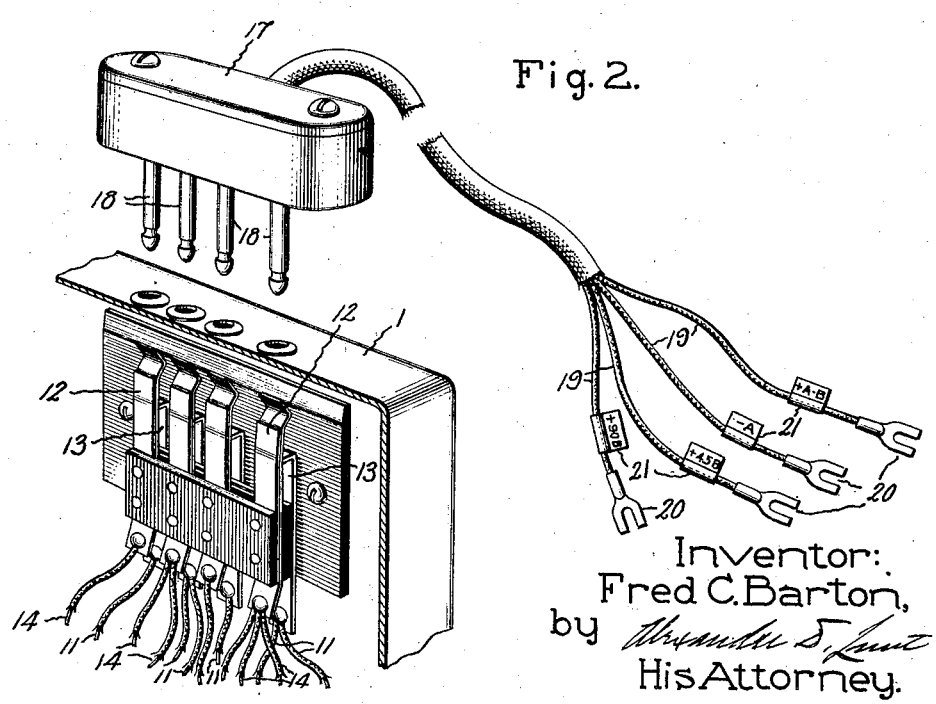

The novel features which I believe to be characteristic of my invention are set forth with particularity in the appended claims; my invention itself however both as to its organization and method of operation will best be understood by reference to the following description taken in connection with the accompanying drawing in which Fig. 1 is a view of a receiving set and the external set of batteries which may be connected to the receiving apparatus, and Fig. 2 is an enlarged view of the means whereby the connection is established.

I have indicated in the drawing a portable receiving set of the suitcase type comprising a case 1, one side of which forms a hinged panel 2 upon which the receiving apparatus may be mounted. In the present case I have indicated receiving apparatus 3 of the superheterodyne type, but it will be understood that any type of receiving apparatus may be employed.

Space is provided within the case 1 for three dry cell A batteries 4, for four small size B batteries 5, and a C battery 6. In case 1 is also enclosed a loud speaker comprising a receiving unit 7 and a horn 8. The opening of the horn is arranged opposite a grill work 9 in the panel 2. A receiving loop 10 may be mounted for rotation upon the top of the case 1. When the set is to be transported the receiving loop 10 may be fitted inside of a cover, which is not shown, and which may be made to cover the panel 2.

The set of batteries inside of the case 1 may be connected by suitable connectors 11 to a plurality of spaced jacks, each of which has cooperating contact members 12 and 13. Connectors 11 are connected to contacts 13 and contactors 12 are connected by suitable connectors 14 to the receiving apparatus. When it is desired to connect to the receiving apparatus, the external set of batteries comprising the A batteries 15 and B batteries 16, a plug member 17 having four contact members 18 is inserted in the jacks. Contact members 18 make contact with contact members 12 and in so doing break contact between the contact members 12 and 13, thus the set of A and B batteries within the case 1 is automatically disconnected from the receiving apparatus and the external set of A and B batteries is connected thereto.

It will be noted that the contact members 18 as well as the jacks are unequally spaced. By reason of this expedient the plug member 17 can only be inserted in the jacks in the proper manner to establish the correct connections between the batteries and the receiving apparatus. The conductors 19 which are connected to the contact members 18 of the plug are preferably provided near their terminals 20 with tags 21, indicating the proper connection to the batteries. It will be apparent therefore that when the conductors 19 are properly connected to the batteries, as indicated by the markings on the tags 21, it will be impossible to establish an improper connection between the external set of batteries and the receiving apparatus, and thereby cause injury to the tubes.

While I have shown and described only one embodiment of my invention, it will be apparent that many modifications in the structural details may be made without departing from the scope thereof, as set forth in the appended claims.

What I claim as new and desire to secure by Letters Patent of the United States, is:

1. The combination, in a radio receiving set, of a receiving apparatus enclosed in a case of such dimensions that batteries for the operation of the set may be located inside of the case, a set of terminal members connected to batteries within the case, movable elements connected to the set and normally in engagement with said terminal members to connect the set with said batteries within the case, and means cooperating with said movable elements to connect batteries outside of the case with said set.

2. The combination, in a radio receiving set, of a receiving apparatus enclosed in a case of such dimensions that batteries for the operation of the set may be located inside of the case, a set of terminal members connected to batteries within the case, movable elements connected to the set and normally in engagement with said terminal members to connect the set with said batteries within the case, and a set of contact members connected to batteries outside of the case and adapted to engage said movable elements thereby to connect said outside batteries to the set and to actuate said movable members out of engagement with said terminal members.

3. The combination in a radio receiving set of a case adapted to contain a receiving apparatus and batteries for the operation of such apparatus, a plurality of irregularly spaced jacks mounted within said case each of said jacks comprising a single pair of contact members adapted normally to engage each other thereby to connect a battery within the case to a receiving apparatus therein, and a plug member having a plurality of contacts, each of said contacts being adapted to engage a contact of one of said jacks thereby to establish connections between a receiving apparatus within the case and a set of batteries outside of the case and to separate said normally engaged contact members.

4. The combination in a radio receiving set of a case adapted to contain a receiving apparatus and batteries for the operation of such apparatus, a plurality of spaced jacks mounted within said case, each of said jacks comprising a pair of contact members adapted to connect a battery within the case to a receiving apparatus therein, and a plug member having a plurality of contacts adapted to coact with said jacks and establish connections between a receiving apparatus within the case and a set of batteries outside of the case and at the same time separate the contact members of the jacks and disconnect from a receiving apparatus a set of batteries within the case.

5. The combination, in a radio receiving set, of a receiving apparatus enclosed in a case of such dimensions that batteries for the operation of the set may be located inside of the case, a set of contact members, means whereby said members may be connected to batteries within the case, a second set of contact members connected to the set and normally in engagement with said first named contact members to connect the set with said batteries within the case, and external means adapted simultaneously to engage and move one set of said contact members to provide an auxiliary battery connection for the set outside of the case.

6. The combination, in a radio receiving set, of a receiving apparatus, a case for enclosing said apparatus, said case being of such dimensions that batteries for the operation of the set may be located therein, a set of contact members provided with means for connection with batteries within the case, a second set of contact members connected to the receiving apparatus and normally in engagement with said first named contact members to connect the set with batteries within the case, and a set of external contact members and means for connecting the same to batteries outside of the case, said last named contact members being adapted to engage one set of said engaged contact members thereby to connect said outside battery connecting means to the set and to disengage said contact members.

7. In combination, a radio receiving apparatus, a case for enclosing said apparatus, means providing a source of energy for said apparatus mounted in said case, means including a set of separable contacts providing electrical connections between said apparatus and said first named means, and external means for supplying energy to said apparatus, said means being adapted to separate said contacts and engage certain of the same to provide a connection with the set to the exclusion of the internal source of energy.

In witness whereof, I have hereunto set my hand this 20th day of July, 1925.

FRED C. BARTON.